United States Patent [19]

Oishi et al.

[11] Patent Number: 4,488,190
[45] Date of Patent: Dec. 11, 1984

[54] MAGNETIC RECORDING DISK CARTRIDGE

[75] Inventors: Kengo Oishi; Osamu Suzuki, both of Odawara, Japan

[73] Assignee: Fuji Photo Film Co., Ltd., Japan

[21] Appl. No.: 558,428

[22] Filed: Dec. 6, 1983

[30] Foreign Application Priority Data

Dec. 9, 1982 [JP] Japan .......................... 57-186639[U]

[51] Int. Cl.³ ...................... G11B 5/012; G11B 5/52; G11B 23/02
[52] U.S. Cl. ........................................ 360/97; 360/86; 360/133
[58] Field of Search ...................... 360/97, 99, 86, 133, 360/132, 131; 235/475, 483; 242/179, 197

[56] References Cited

U.S. PATENT DOCUMENTS 4,320,430 3/1982 Vogt ..................................... 360/133
4,412,260 10/1983 Stricklin ............................. 360/132
4,419,703 12/1983 Gruczelak ........................... 360/97

Primary Examiner—Robert M. Kilgore
Attorney, Agent, or Firm—Gerald J. Ferguson, Jr.; Joseph J. Baker

[57] ABSTRACT

A magnetic recording disk cartridge comprises a recording disk and a causing for accommodating the recording disk. The cartridge is provided with a shutter member for closing the magnetic head receiving openings in the casing. The shutter member is mounted in the casing for pivotal movement along the inner surface of the casing between an operative position in which it closes the magnetic head receiving opening and an inoperative position in which it opens the same. The shutter member is provided with projections on the surface facing the inner surface of the casing and slides on the projections along the inner surface of the casing when it is moved between the operative position and the inoperative position.

3 Claims, 2 Drawing Figures

MAGNETIC RECORDING DISK CARTRIDGE

BACKGROUND OF THE INVENTION

1. Field of the Invention

This invention relates to a magnetic recording disk cartridge, and more particularly to a magnetic recording disk cartridge for a magnetic recording disk which is small in diameter and extremely thin in thickness and which is rotated at a high speed for recording or reproduction.

2. Description of the Prior Art

There has come into wide use as a recording medium for computers a floppy disk which is a flexible disk of polyester resin coated with magnetic material on both sides thereof and on which digital information is recorded by a magnetic head. The floppy disk is easy to handle and inexpensive.

Recently, there has been proposed a photographic still camera in which, instead of a conventional silver salt photographic film which cannot be reused, a magnetic recording disk smaller than the floppy disk both in thickness and diameter is used as a recording medium. This still camera is generally referred to as "an electronic camera". This electronic camera is generally about the size of a typical 35 mm photographic camera. In the electronic camera the image of an object is magnetically recorded on the magnetic recording disk while the disk is rotated at a high speed. Generally the magnetic recording disk for the electronic camera is accommodated in a hard casing to form a cartridge and is loaded in the camera body together with the casing.

The magnetic recording disk for the electronic camera comprises a recording medium which is small in diameter and is extremely thin, and a hub fixed to the center of the recording medium. The casing for the disk has a hub opening through which the hub is exposed and a pair of magnetic head receiving openings in the front and rear side walls thereof, the magnetic head receiving openings being provided to give the magnetic head of the recording-reproducing system access to the recording medium. In this specification, the term "recording-reproducing system" should be broadly interpreted to include systems for recording only and for reproduction only.

In recording images using a magnetic recording medium, signals are densely recorded on the magnetic recording medium since video signals have a wider frequency band than digital signals or audio signals. Accordingly, when fine unevenness, scratches or flaking exists in the magnetic coating on the magnetic recording medium or when dust is deposited on the magnetic coating, so-called drop-out occurs during reproduction and the recorded signals cannot be faithfully reproduced. Since the magnetic recording disk cartridge for the electronic camera is frequently used outside, dust is apt to get into the inside of the casing through the magnetic head receiving openings to adhere to the surface of the recording medium and there is a danger that the part of the recording medium exposed through the magnetic head receiving openings may be brought into contact with something outside the casing to be scratched thereby, while the cartridge is being carried.

Therefore, such cartridges are generally provided with a shutter member which normally closes the magnetic head receiving opening and opens when the cartridge is loaded in the recording-reproducing system.

The shutter member is typically a flat member which is rotatably supported on an engaging portion formed at the center of the casing and is connected to a connecting member having an end portion exposed outside the casing, and is moved along the inner surface of the casing to open and close the magnetic head receiving opening in response to operation of the exposed end portion of the connecting member. Since the shutter member is generally stamped from, for instance, a steel plate, the shutter member inherently has a burr on one surface thereof along its peripheral edge. Therefore, when the shutter member is mounted with the surface bearing thereon the burr being directed toward the inner surface of the casing, it becomes hard to move the shutter member due to increased friction between the inner surface of the casing and the surface of the shutter member. This problem can be overcome by barreling the stamped shutter member, for example. However, since the shutter member is made extremely thin so as to be mountable in the flat casing, it is apt to be bent during barreling.

SUMMARY OF THE INVENTION

In view of the foregoing observations and description, the primary object of the present invention is to provide a magnetic recording disk cartridge in which the shutter member can be opened and closed with light force even if the burr thereon is not removed.

The magnetic recording disk cartridge of the present invention is characterized in that the shutter member is provided with at least one projection on its outer surface facing the inner surface of the casing so that the shutter member slides on the projection along the inner surface of the casing.

In the magnetic recording disk cartridge of the present invention, the shutter member is brought into contact with the inner surface of the casing only at the projection, whereby sliding friction therebetween is reduced and at the same time, burr on the shutter member, if any, is spaced away from the inner surface of the casing by the projection. Therefore, the shutter member can be smoothly opened and closed with light force.

DESCRIPTION OF THE PREFERRED EMBODIMENTS

Figure 1:
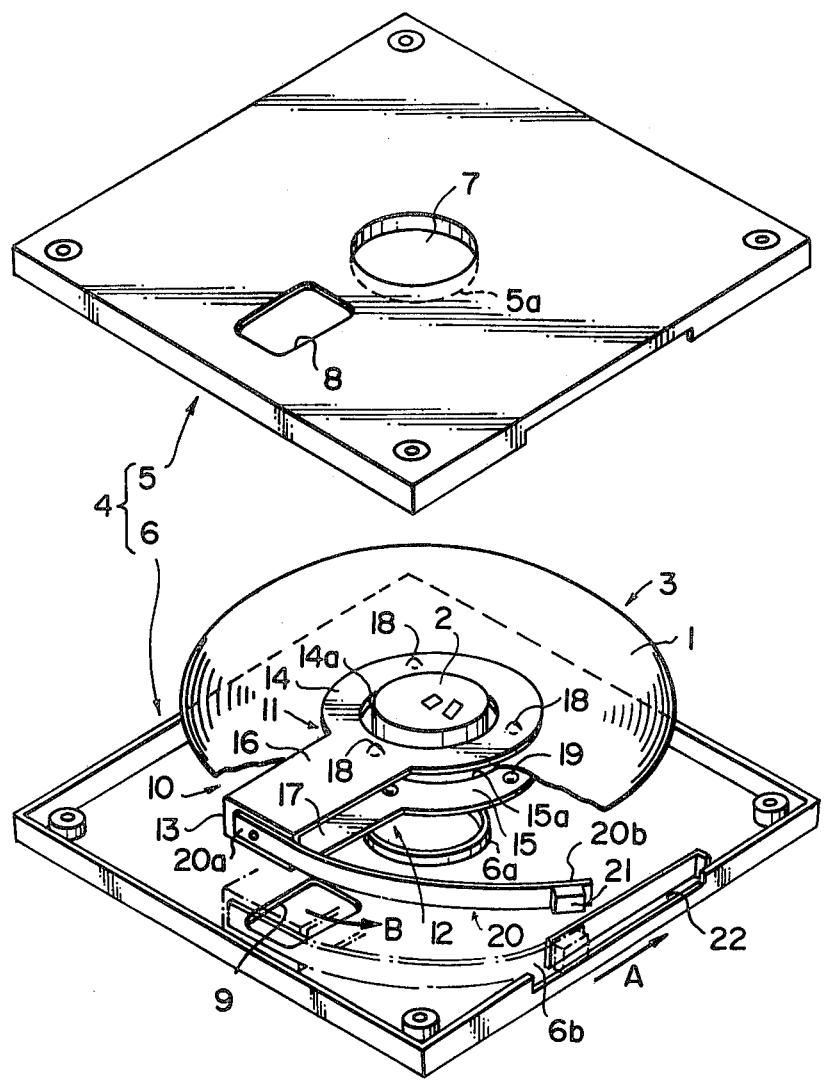
FIG. 1 is an exploded perspective view of a magnetic recording disk cartridge in accordance with an embodiment of the present invention.

FIG. 1 shows a magnetic recording disk cartridge in accordance with an embodiment of the present invention comprising a magnetic recording disk 3, which consists of a thin flexible magnetic recording medium 1 and a hub 2 fixed to the center of the recording medium 1, and a casing 4 for accommodating the magnetic recording disk 3. The magnetic recording medium 1 is composed of a very thin polyester sheet having a thickness of, for instance, $50\mu$ or less with a magnetic coating formed thereon by, for instance, applying, vapor-depositing or sputtering a magnetic material appropriate for the purpose. The casing 4 comprises upper and lower halves 5 and 6 which are secured together with screws or by supersonic welding, for example. The upper half 5 is provided with a hub opening 7 at its center through which the hub 2 of the recording disk 3 is exposed, and an annular engaging rib 5a which stands inwardly (downwardly) from the periphery of the hub opening 7. The lower half 6 is provided with an annular engaging rib 6a which is similar to the rib 5a of the upper half 5 and is opposed to the same. A pair of magnetic head receiving openings 8 and 9 are respectively formed in the upper and lower halves 5 and 6 opposed to each other.

A shutter member 10 comprises first and second arm portions 11 and 12 which are connected with each other by a connecting portion 13, and is formed by stamping and bending a resilient material such as a steel plate. The first and second arm portions 11 and 12 are respectively provided with bearing portions 14 and 15 respectively having circular engaging openings 14a and 15a. The bearing portions 14 and 15 are respectively connected to the connecting portion 13 by way of rectangular shutter portions 16 and 17 which are adapted to close the magnetic head receiving openings 8 and 9 as will be described later. Three projections 18 are formed on the upper surface of the bearing portion 14 of the first arm portion 11 equiangularly spaced from each other, and three similar projections 19 are formed on the lower surface of the bearing portion 15 of the second arm portion 12 equiangularly spaced from each other. The projections 18 and 19 have rounded tips and are formed, for instance, by pressing. The first and second arm portions 11 and 12 of the shutter member 10 extend on opposite sides of the recording disk 3, and the engaging openings 14a and 15a of the bearing portions 14 and 15 respectively receive engaging ribs 5a and 6a of the upper lower halves 5 and 6 so that the shutter member 10 can be rotated about the engaging ribs 5a and 6a which are disposed coaxially and respectively receive the upper and lower portions of the hub 2 with the upper portion of the hub 2 exposed through the hub opening 7.

An elongated connecting member 20 formed of a resilient material such as a steel plate is connected to the connecting portion 13 of the shutter member 10 at one end 20a by spot welding, for example. An abutment member 21 is fixed to the other end 20b of the connecting member 20. The abutment member 21 is exposed outside through a cutaway portion 6b in the lower half 6 and is received in a channel 22 provided in one side of the casing 4, as shown by the chained line in FIG. 1, in the assembled state of the cartridge to be slid therealong. The shutter member 10 is formed of a resilient material such as a steel plate and is formed so that the first and second arm portions 11 and 12 thereof diverge away from each other toward the bearing portions 14 and 15, whereby the bearing portions 14 and 15 are resiliently pressed against the inner surfaces of the upper and lowers halves 5 and 6 around the engaging ribs 5a and 6a not to be disengaged therefrom. However, the bearing portions 14 and 15 are in contact with the inner surface of the respective halves 5 and 6 only at the tip of the projections 18 and 19.

In the assembled state of the cartridge, the shutter member 10 is positioned in an operative position shown by the chained line by urging means (not shown) which may be a known one conventionally employed in the art. In the operative position, the shutter portions 16 and 17 respectively close the magnetic head receiving openings 8 and 9 to prevent the recording medium 1 of the disk 3 from being brought into contact with something outside the casing 4 and being scratched thereby.

When the cartridge is loaded in the recording-reproducing system, the abutment member 21 is engaged with an engaging member provided in the system and is moved in the direction of the arrow A in FIG. 1, whereby the shutter member 10 is rotated in the direction of the arrow B to its inoperative position in which the shutter portions 16 and 17 are retracted from the respective magnetic head receiving openings 8 and 9 to open them.

Since the bearing portions 14 and 15 are in point-contact with the inner surfaces of the upper and lower halves 5 and 6, the frictional force generated therebetween when the shutter member 10 is moved to the inoperative position is extremely small and accordingly the shutter member 10 is easily moved by light force. Further, the burr on the shutter member 10, if any, cannot interfere with the inner surfaces of the upper and lower halves 5 and 6 to prevent movement of the shutter member 10 since it is spaced away from the inner surfaces of the halves 5 and 6 by virtue of the projections 18 and 19.

When the magnetic head receiving openings 8 and 9 are opened, the magnetic head has access to the recording disk 3 for recording or reproduction while the recording disk 3 is rotated at a high speed by the rotational shaft of the recording reproducing system which is engaged with the hub 2 of the disk 3.

Since the connecting member 20 is formed of resilient material, it maintains the outwardly convex shape shown in FIG. 1 when it is moved as described above and does not prevent rotation of the recording disk 3.

When the cartridge is taken out from the recording-reproducing system, the shutter member 10 is returned to the operative position by said urging means. Also at this time, the shutter member 10 can be moved with light force by virtue of the projections 18 and 19. Accordingly, the urging means may be small in size.

Figure 2:
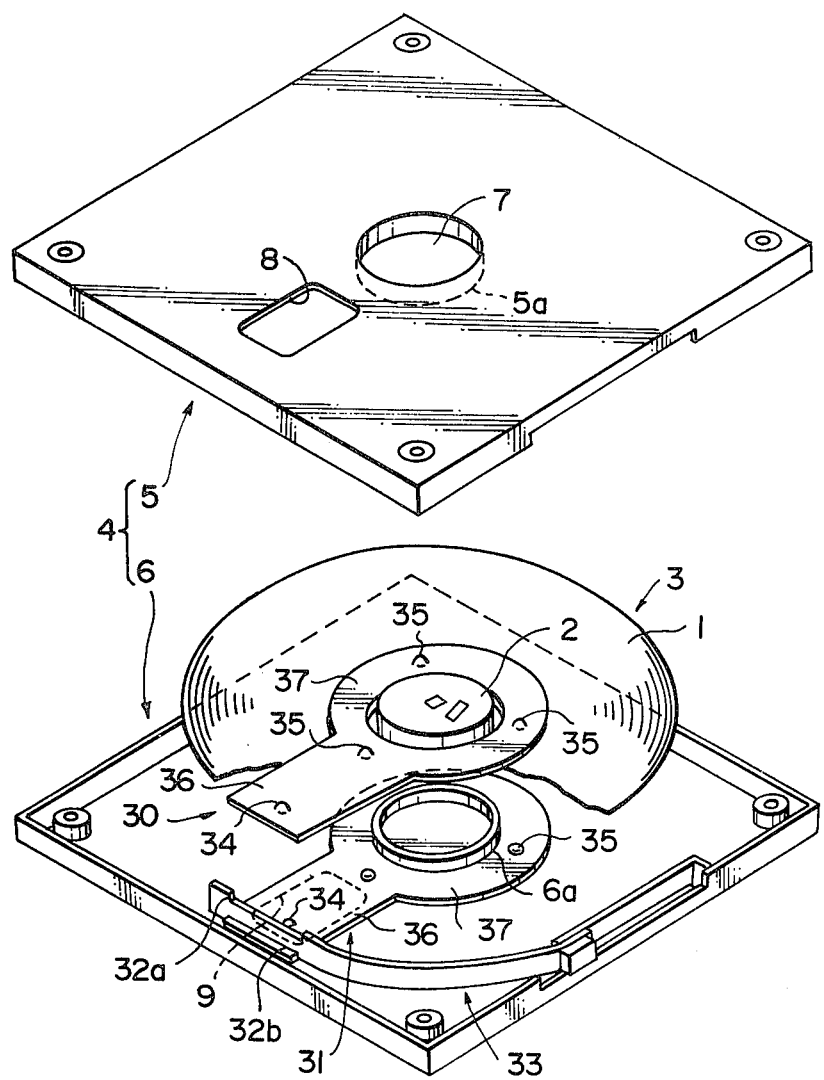
FIG. 2 is an exploded perspective view of a magnetic recording disk cartridge in accordance with another embodiment of the present invention.

Though in the embodiment shown in FIG. 1, the shutter portions 16 and 17 for respectively closing the magnetic head receiving openings 8 and 9 of the upper and lower halves 5 and 6 are formed on the shutter member 10 which is of one piece, in the embodiment shown in FIG. 2, the magnetic head receiving openings 8 and 9 in the upper and lower halves 5 and 6 are closed by shutter portions formed on separate shutter members which are separately fixed to a connecting member.

In FIG. 1, the outer ends of first and second shutter members 30 and 31 which respectively correspond to the first and second arm portions 11 and 12 in the embodiment shown in FIG. 1 are fixedly fitted into engaging recesses 32a and 32b formed on one end of a connecting member 33. The first and second shutter members 30 and 31 extend substantially in parallel to each other on opposite sides of the recording disk 3. Since the arrangement and operation of the shutter mechanism of this embodiment are similar to those of the embodiment shown in FIG. 1 and are easily understood from FIG. 2 and the description above, they will not be described here. Though in the embodiment shown in FIG. 1, the projections are provided only on the bearing portion of each arm portion, a single projection 34 is provided on the shutter portion 36 of each shutter members 30 and 31 in addition to three projections 35 on the bearing portion 37 of each shutter member in this embodiment. This is because the shutter members 30 and 31 are substantially in parallel to the inner surfaces of the upper and lower halves 5 and 6 in this embodiment while the first and second arm portions 11 and 12 diverge away from each other in the embodiment of FIG. 1.

We claim:

1. A magnetic recording disk cartridge comprising a magnetic recording disk, a casing which accommodates the magnetic recording disk and has at least one magnetic head receiving opening, and a shutter member for closing the magnetic head receiving opening, the shutter member being mounted in the casing for rotation along the inner surface of the casing between an operative position in which it closes the magnetic head receiving opening and an inoperative position in which it opens the same, characterized in that said shutter member is provided with at least one projection on the surface facing the inner surface of the casing and slides on the projection along the inner surface of the casing when it is rotated between the operative position and the inoperative position.

2. A magnetic recording disk cartridge as defined in claim 1 in which said shutter member comprises an annular bearing portion which is rotatably engaged with an annular engaging rib formed to project inwardly at the center of the casing and a plate-like shutter portion extending radially outwardly from the bearing portion, and said projection is provided on the surface of the bearing portion facing the inner surface of the casing.

3. A magnetic recording disk cartridge as defined in claim 2 in which said projection is further provided on the surface of said shutter portion facing the inner surface of the casing.

* * * * *